Dec. 7, 1943.    L. W. YOUNG    2,335,987
BLOWPIPE VALVE MEANS
Original Filed Dec. 31, 1937

INVENTOR
LLOYD W. YOUNG
BY
ATTORNEY

Patented Dec. 7, 1943

2,335,987

UNITED STATES PATENT OFFICE 2,335,987

BLOWPIPE VALVE MEANS

Lloyd W. Young, Scotch Plains, N. J., assignor, by mesne assignments, to Union Carbide and Carbon Corporation, a corporation of New York Original application December 31, 1937, Serial No. 182,840, now Patent No. 2,249,338, dated July 15, 1941. Divided and this application November 23, 1940, Serial No. 366,827

7 Claims. (Cl. 251—164)

This invention relates to blowpipe valve means, and more particularly to cutting blowpipes which possess operating characteristics of the highest standard and yet are extremely light in weight, simple in construction, and less expensive to manufacture and to maintain in efficient operating condition than known blowpipes of similar characteristics.

An object of the invention is to provide a light weight blowpipe of simple construction having a small number of parts, and possessing operating characteristics of the highest standards. Another object is to provide a blowpipe having an improved cutting-oxygen supply-valve. A further object is to provide blowpipe cutting-oxygen supply-valve means of improved construction and operating characteristics.

The above and other objects and novel features of the invention will be apparent from the following description taken with the accompanying drawing, in which.

Figure 1:
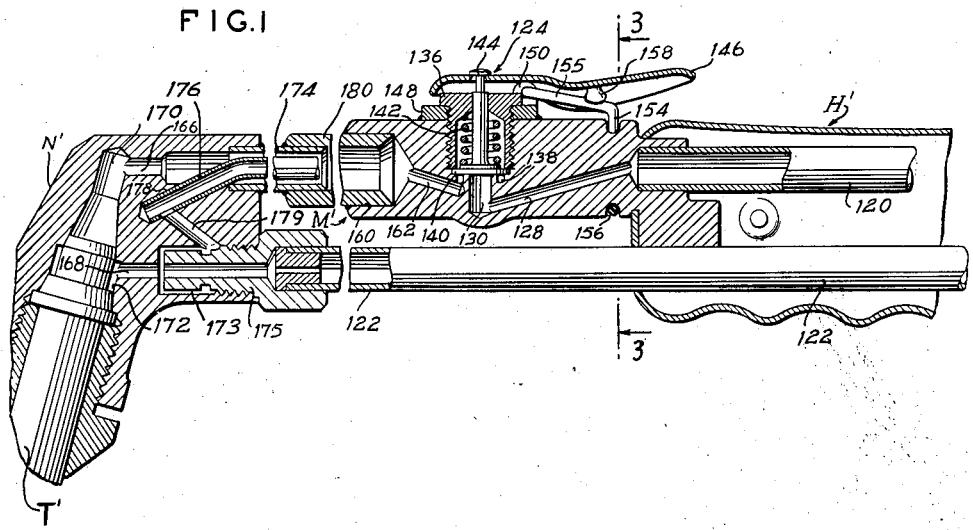
Fig. 1 is a broken sectional view of a cutting blowpipe embodying the principles of this invention.
Figure 2:
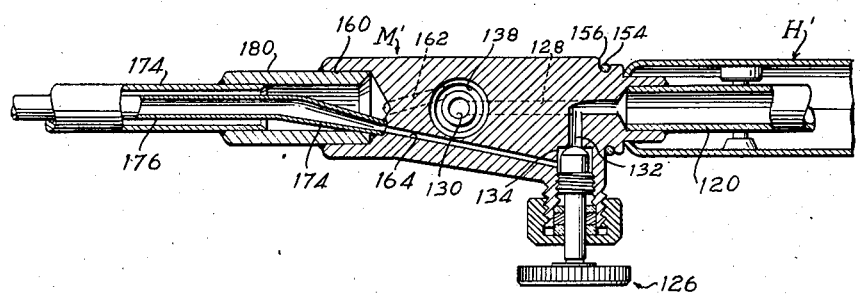
Fig. 2 is a broken plan sectional view of a portion of the blowpipe shown in Fig. 1.
Figure 3:
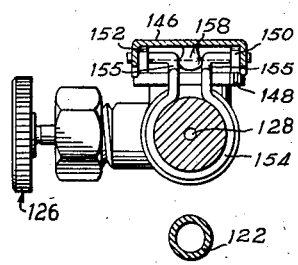
Fig. 3 is a sectional view taken along line 3—3 of Fig. 1.

Referring to Figs. 1 to 3, inclusive, the principles of the invention are shown as applied to a cutting blowpipe comprising a handle H' of substantially the same construction as the handle 40 of the welding blowpipe of Fig. 4 of my application, Serial No. 182,840, filed December 31, 1937, now Patent No. 2,249,338, dated July 15, 1941, of which the present application is a division. The handle H' surrounds an oxygen conduit 120 and an acetylene conduit 122. The rear ends of these conduits are connected to oxygen and acetylene hoses in the same manner that conduits 41 and 42 of the blowpipe disclosed in such Fig. 4 are connected to their respective hoses.

The forward end of the acetylene conduit 122 is connected to a mixer within the head N'. The forward end of the oxygen conduit 120 terminates in a valve body M' rigidly secured to the forward end of handle H'.

Valve body M' is adapted to contain a cutting oxygen valve assembly 124 and a preheat oxygen valve 126. It is provided with a passage 128 opening into a cutting oxygen chamber 130, and having a branch passage 132 (see Fig. 2) opening into a preheat oxygen chamber 134. The bore forming chamber 130 is counterbored and threaded to receive a bushing 136. A channel 138 is provided at the bottom of the threaded counterbore and a flexible diaphragm 140 is positioned thereover. The diaphragm is securely seated at the external periphery of channel 138 by the bushing 136, and may be held in sealed relation with the inner periphery of channel 138 thus forming a valve for controlling the flow of cutting oxygen to channel 138. Seating of diaphragm 140 on the seat between channel 138 and chamber 130 may be accomplished by a spring 142 within a chamber of bushing 136. The diaphragm 140 has a plane central surface portion facing and wholly exposed to the entire cross-sectional area of the bore or inlet passage 130. A valve stem 144 is adapted to be positioned within spring 142, and is provided at its inner end with an integral disc between the inner end of spring 142 and diaphragm 140, the integral disc being secured to diaphragm 140 in any suitable manner. The outer end of stem 144 extends through the head of bushing 136 and is attached to one end of a valve operating handle 146. A plate 148 is positioned between the body M' and a flange of bushing 136, upon which is mounted a pair of spaced ears 150 and 152 (see Fig. 3).

A spring-clip 154 substantially encircles body M' and is positioned within a groove 156. The clip 154 includes a pair of spaced parallel arm portions 155 extending above and along the top of body M', which portions are finally bent at right angles with respect to the respective arm portions, pass through the ears 150, 152 and through aligned apertures in the sides of the handle 146 thus forming trunnions on which handle 146 is pivoted. The handle 146 may be disassembled by simply squeezing together the parallel arm portions 155 of the spring clip 154 until their bent end portions have been withdrawn from engagement with the apertures in handle 146.

The handle 146 is maintained in a position corresponding to closed position of diaphragm valve 140 by the action of the spring 142. Handle 146 may be held in a position corresponding to the open position of diaphragm 140 by a releasable snap connection. A knob 158 (see Figs. 1 and 3) is fixed to the under surface of handle 146 in position to cooperate with the forwardly extending parallel arms 155 of clip 154. The knob 158 is provided with a head and neck portion, so arranged that pressure on the rear end of handle 146 will cause the head to pass between the arms 155 of clip 154 which arm portions then engage the neck portion and hold the handle in position to permit oxygen to force diaphragm valve 140 from its seat and pass into channel 138. The handle 146 may be snapped to closed position by pressure applied thereto forwardly of the pivot point, or ears 150, 152.

Referring to Fig. 2, the preheat chamber 134 is adapted to be closed by a valve 126. The forward end of the body M' is provided with a relatively large bore 160, and a pair of passages 162, 164 are drilled from the bottom of bore 160 to the channel 138, and the chamber 134, respectively. The cutting, and preheat oxygen are conducted to the head N' by concentric conduits 174, 176 connected to the body M' within the bore 160, and to the head N' in a novel manner to be described.

The following parts will be described in the order of their assembly, beginning with the head N', which comprises a forward portion adapted to receive a tip T', and a rear portion to which the cutting and preheat oxygen conduits, and the acetylene conduit are connected. The head is provided with cutting-oxygen and fuel-gas passages 166 and 168 terminating respectively in chambers 170 and 172. The fuel gas passage is counterbored to provide a mixing chamber 173 having a mixer 175 fixed therein which latter is connected to the restricted end of acetylene conduit 122.

The passage 166 is counterbored to receive the concentric arrangement of the cutting and preheat oxygen conduits 174 and 176, respectively. A chamber 178 is formed within head N' by drilling from the mouth of the counterbore of passage 166. The preheat oxygen conduit 176 is then soldered in place within chamber 178, and bent to pass concentrically out of the counterbore. The cutting oxygen conduit 174 is then slipped over conduit 176 and soldered in place within the counterbore of passage 166. Before assembling the mixer 175 within the mixing chamber 173, a passage 179 is drilled from the mouth of the counterbore of passage 168 and through the conduit 176, thus establishing communication between chamber 178 and the mixing chamber 173.

A sleeve 180 is adapted to slide on the rear end of conduit 174 so that it will complete said conduit and permit the soldering of the rear end of conduit 174 to the body M' within bore 160 and at the outlet of passage 164. Sleeve 180 is then positioned so that its rear end is within bore 160 and it is finally soldered to the body M' and conduit 174, respectively.

From the foregoing it is apparent that the oxygen enters the blowpipe and passes through conduit 120 to passage 128 where it divides; the cutting oxygen continuing along passage 128 to chamber 130 past diaphragm valve 140 to passage 162, along the annular passage formed by conduits 174 and 176 through passage 166 in the head N' to chamber 170. The preheat oxygen branches off from passage 128 through passage 132 (see Fig. 2) to chamber 134, duct 164, conduit 174, cross passage 179 in head N', to the mixing chamber 173 where it is mixed with acetylene from conduit 122.

The form of the invention here described and illustrated in the accompanying drawing is disclosed merely to indicate how the invention may be applied. Other forms, differing in detail but not in principle from those here shown and described, will, of course, suggest themselves to those skilled in the art.

In the embodiment of the invention, shown in the drawing, clip arms 155 limit movement of the operating handle 146 to prevent rupture of the diaphragm valve by abnormal flexure thereof.

What is claimed is:

1. In a blowpipe having a valve body and a gas passage therethrough, a flexible diaphragm valve adapted to be urged into seating engagement with a portion of said gas passage to control the flow of gas therethrough, and means including a snap operated lever for operating said flexible diaphragm valve, the combination of a spring clip substantially surrounding said valve body and forming a pivot for said lever; and a knob associated with said lever for cooperation with said clip releasably to lock said lever in a predetermined position.

2. In a blowpipe as claimed in claim 1, wherein said valve includes a spring adapted to urge said flexible diaphragm valve into seating engagement with a portion of said gas passage, and said knob cooperates with said spring clip releasably to lock said flexible diaphragm valve in open position against the action of said spring.

3. A blowpipe valve means comprising, in combination, a body provided with a valve chamber having an inlet passage surrounded by an annular valve seat, and an outlet passage leading from said chamber; an impervious resilient diaphragm valve movable against said valve seat to control the flow of fluid from said inlet to said outlet; and means for moving said diaphragm valve toward and away from said seat, including a lever and a spring clip secured to said valve body and also forming a pivot for said lever, said lever being provided with a knob adapted to engage said spring clip releasably to lock said lever in a predetermined position.

4. A blowpipe valve means as claimed in claim 3, including a valve stem one end of which is connected to said diaphragm valve and the other end of which is connected to said lever, said knob cooperating with said spring clip releasably to lock said lever in position with said diaphragm valve spaced from said valve seat.

5. Blowpipe cutting-oxygen supply-valve means comprising, in combination, a body having an annular groove and a valve chamber provided with inlet and outlet passages, an impervious flexible diaphragm valve in said chamber for controlling the flow of cutting oxygen between said inlet and outlet passages, spring means normally urging said valve into one position, and means for flexing said valve into another position and temporarily locking it in such position against the force of said spring means comprising a handle connected to said valve and having a knob provided with a head and neck, and a spring clip substantially encircling said body within said annular groove, said clip including a pair of spaced parallel arms terminating in trunnions extending at right angles thereto, and means mounted on said body provided with ears through which said trunnions extend, said handle being pivoted to said trunnions, and the construction and arrangement being such that sufficient tilting pressure on said handle causes said head to snap between said arms which then engage said neck to hold said handle with said valve flexed in such position.

6. Blowpipe cutting-oxygen supply-valve means comprising, in combination, a body having an annular groove and a valve chamber provided with inlet and outlet passages, a valve in said chamber for controlling the flow of cutting oxygen between said inlet and outlet passages, means normally urging said valve into one position, and means for flexing said valve into another position and temporarily locking it in such position against the force of said means comprising a handle connected to said valve and having a knob provided with a head and neck, and a clip substantially encircling said body within said annular groove, said clip including a pair of spaced parallel arms terminating in trunnions extending at right angles thereto, and means mounted on said body provided with ears through which said trunnions extend, said handle being pivoted to said trunnions, and the construction and arrangement being such that sufficient tilting pressure on said handle causes said head to snap between said arms which then engage said neck to hold said handle with said valve flexed in such position.

7. Blowpipe cutting-oxygen supply-valve means comprising, in combination, a body having an annular groove and a valve chamber provided with inlet and outlet passages, a valve in said chamber for controlling the flow of cutting oxygen between said inlet and outlet passages, means normally urging said valve into closed position, and means for flexing said valve into open position and temporarily locking it in open position against the force of said means comprising a handle connected to said valve and having a knob provided with a head and neck, and a clip substantially encircling said body within said annular groove, said clip including a pair of spaced parallel arms terminating in trunnions extending at right angles thereto, and means mounted on said body provided with ears through which said trunnions extend, said handle being pivoted to said trunnions, and the construction and arrangement being such that sufficient tilting pressure on said handle causes said head to snap between said arms which then engage said neck to hold said handle with said valve flexed in open position.

LLOYD W. YOUNG.